United States Patent

Motoyama

[11] 4,027,624
[45] June 7, 1977

[54] FLUID GRANULATING/COATING APPARATUS UTILIZING SUCTION AIR CURRENT

[75] Inventor: Shimesu Motoyama, Tokyo, Japan

[73] Assignee: Freund Industrial Co., Ltd., Tokyo, Japan

[22] Filed: Sept. 19, 1975

[21] Appl. No.: 615,123

[30] Foreign Application Priority Data
Sept. 20, 1974 Japan .......................... 49-113203

[52] U.S. Cl. .................................. 118/303; 118/19; 118/24
[51] Int. Cl.² .......................................... B05B 17/00
[58] Field of Search ............... 118/19, 24, 303, 50, 118/308, 309, 312, 602, 610; 612; 127/21; 159/45

[56] References Cited
UNITED STATES PATENTS

| | | |
|---|---|---|
| 3,106,492 | 10/1963 | MacDonald et al. ........... 118/303 X |
| 3,110,626 | 11/1963 | Larson et al. ...................... 118/303 |
| 3,411,480 | 11/1968 | Grass et al. ..................... 118/303 X |
| 3,687,717 | 8/1972 | Philip ............................ 118/303 X |
| 3,880,116 | 4/1975 | Prillig et al. ........................ 118/303 |
| 3,903,839 | 9/1975 | Rowe et al. .................... 118/303 X |

Primary Examiner—Louis K. Rimrodt
Attorney, Agent, or Firm—Watts, Hoffmann, Fisher & Heinke Co.

[57] ABSTRACT

In the fluid granulating/coating apparatus to be worked by utilizing suction air current, a granulating/coating apparatus wherein a receptacle for accommodating bag filters as disposed in the upper part of the apparatus is in the shape of a cylinder with smooth interior, the suction air current is supposed to be discharged by way of one side wall of said cylindrical receptacle, a fan for generating the suction air current and a damper for stopping air suction are installed on the outside of said cylindrical receptacle, and a large-sized safety lid is installed on the upper part of the cylindrical receptacle.

5 Claims, 4 Drawing Figures

FLUID GRANULATING/COATING APPARATUS UTILIZING SUCTION AIR CURRENT

BACKGROUND OF THE INVENTION a. Field of the Invention

The present invention relates to an improvement of the fluid granulating/coating apparatus to be worked by utilizing suction air current.

b. Description of the Prior Art

For the purpose of granulation and or coating in the manufacture of tablets, pills, etc. of foodstuffs, medical supplies and so forth, the employment of a fluid granulating/coating apparatus such as shown in FIG. 1 has hitherto been popular. This apparatus is so designed that, by virtue of the air current generated by the suction air current generating fan 1 disposed on the top of the apparatus, an air current to stream in the direction of arrows with dotted line is generated within the apparatus, the material accommodated in the fluid storing chamber 2 is whirled up by said air current, and a granulating or coating solvent is sprayed in the atomizing chamber 3 through the nozzle 4 equipped in said chamber 3, thereby making it adhere to the material thus whirled up. This art of effecting granulation by generating a suction air current within the apparatus is admittedly advantageous in the case of application to an apparatus provided with a joint between the respective chambers for facilitating the assembling and demounting thereof as it can prevent the atomized solvent or dust from escaping to the outside of the apparatus. However, conventional apparatuses employing this art have been defective in that, because of the suction air current generating fan 1 being disposed directly above the bag filter 5 for collecting the solvent-deposited material and other dusts, the damper 6 for stopping the air suction work in order to clear off dust attached to the bag filter 5 is also disposed directly above the bag filter 5, and as a result, the safety lid 7 to function as the blast screen for securing the working personnel aganist eventual explosion arising from the relation between the static electricity to be generated by the internal friction of the material per se or the friction between the air current and the material and the inflammable atomized solvent, must be installed by the side of the fan 1 and it is infeasible to provide a sufficiently large-sized safety lid.

Besides, particularly in the medical supplies manufacturing industry, in order to conform to the GMP (good manufacturing practice) regulations, an apparatus of this kind is desirable to be employed on the basis of one unit of apparatus for one kind of material to be granulated or coated. However, in the case of manufacturing varieties of medical supplies, it is extremely difficult to assign one apparatus for manufacturingeach item of medical supplies, so that there are many instances where various granulation or coating operations are performed by the use of a single unit of this apparatus. Viewed from this point, the structure of this apparatus permitting demounting of the respective chambers is admittedly convenient as it facilitates the cleaning and repair of the aforesaid chambers, but the disposition of such members as the damper 6 and fan 1 directly above the bag filter 5 would cause adhesion of the dust escaping through the meshes of the filter 5 to these members too. And, inasmuch as it is rather difficult to clean these members perfectly, in the case of this apparatus which is designed to close the damper 6 almost every minute and repeat the motion of clearing off dust attached to the bag filter 5 incessantly by imparting several minutes' oscillation to said filter, there is a great danger of the dust attached to the neglected portions of these members getting mixed in the material in the process of granulation, entailing serious drawbacks from the view point of the control of quality of the products.

SUMMARY OF THE INVENTION

The present invention is characterized in that the receptacle provided in the upper part of the apparatus to accommodate the bag filters is formed in the shape of a cylinder with smooth interior, the suction air current is supposed to be discharged by way of one side wall of said cylindrical receptacle, the fan for generating said suction air current, the damper for stopping air suction, etc. are disposed to keep off from directly above said cylindrical receptacle by taking into account the foregoing defect in the prior art, and the top plate of the cylindrical receptacle is provided with large-sized safety lids. This contrivance not only facilitates the cleaning of the bag filter receptacle, but also leaves no room for deposition of dust directly above said receptacle, thereby rendering an improved apparatus having a perfect blast screen and capable of performing various granulation and coating operations without hindrance.

DESCRIPTION OF THE PREFERRED EMBODIMENTS

In the appended drawings.

Figure 1:
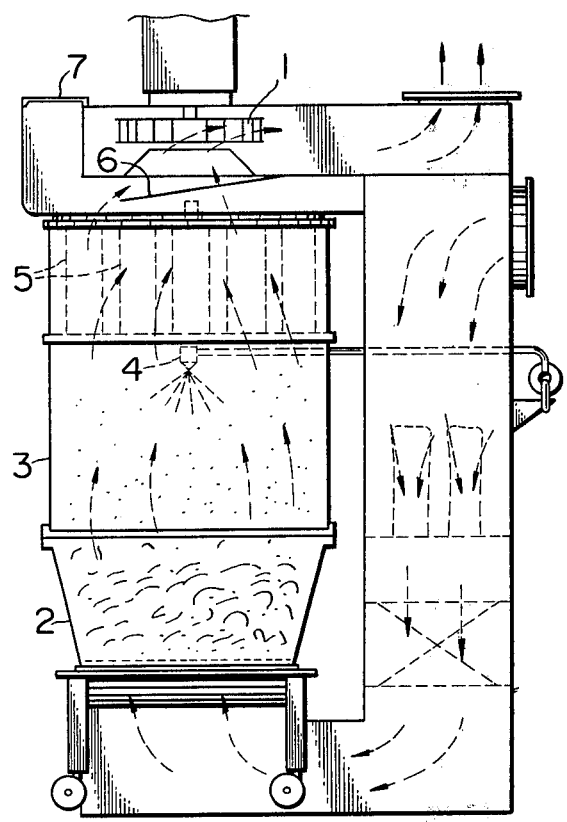
FIG. 1 illustrates a prior art granulating/coating apparatus.
Figure 3:
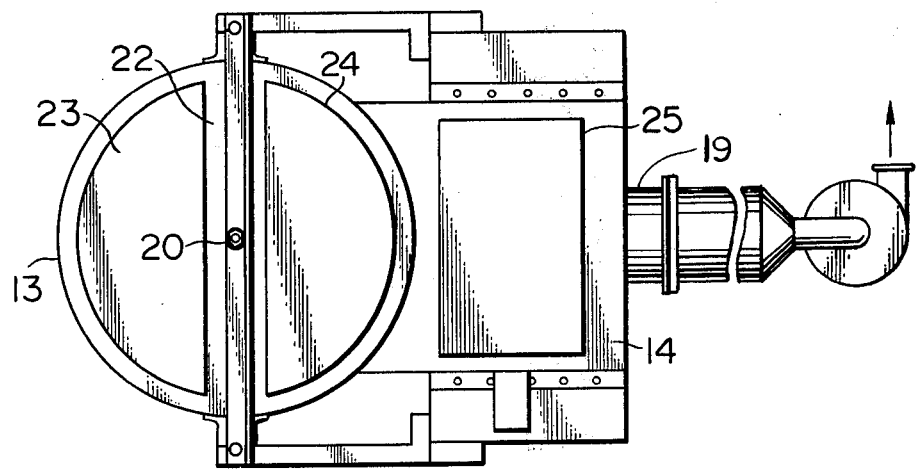
FIG. 2 and FIG. 3 are a partially cut side view and a plane figure, respectively, of an apparatus embodying the present invention.
Figure 2:
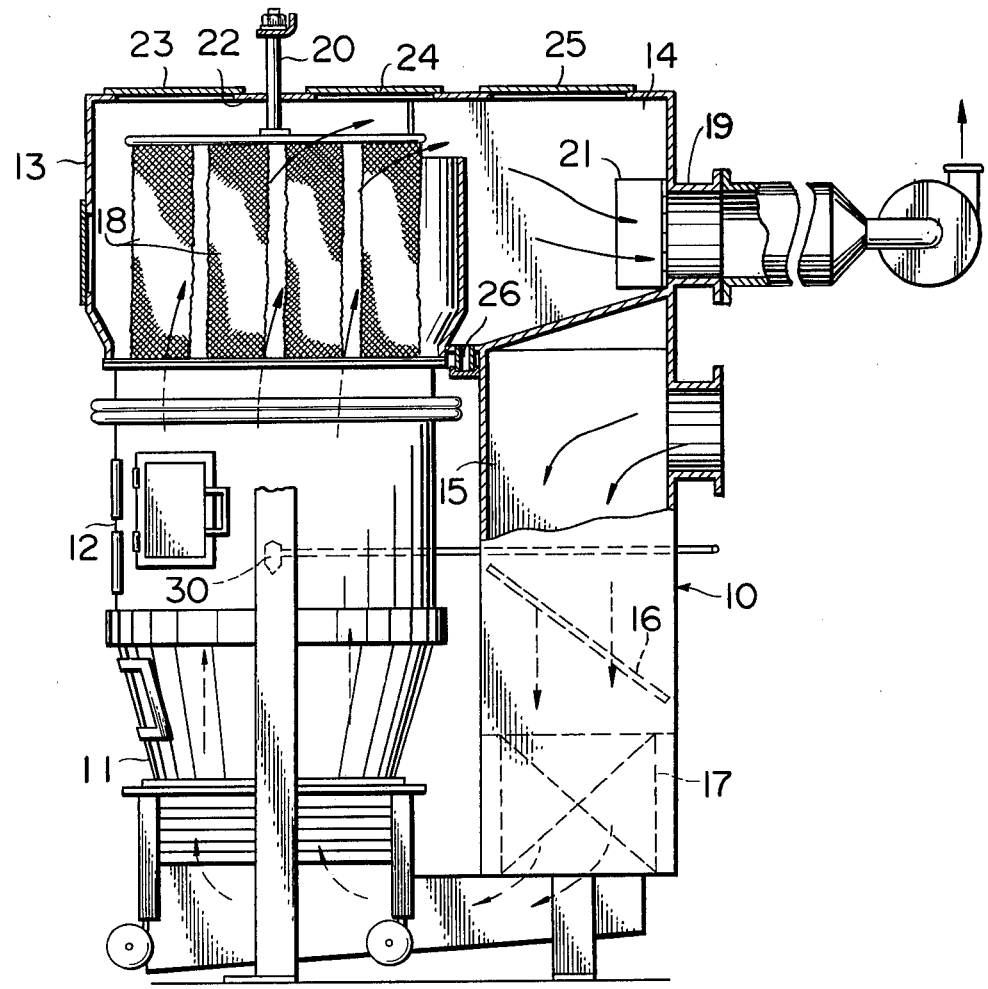

In the embodiments shown in the appended drawings, the apparatus consists of a material fluid storing chamber 11 which can be demounted from the body 10, the solvent atomizing chamber 12 which is combined with said material fluid storing chamber 11 by disposing thereon, the material catching chamber 13 mounted on said chamber 12 which comprises a cylindrical receptacle with smooth interior for accommodating the bag filters 18, and, in addition thereto, the suction air current generating equipment not shown in the drawings, coupled with the controlling means for automatically operating said apparatus.

In the upper part of the body 10 is provided the exhaust passage 14, and a part beneath said exhaust passage 14 constitutes the suction air passage 15, whereby the suction air current as heated while passing the filter 16 and the heater 17 equipped in said suction air passage 15 is to flow in the fluid storing chamber 11 along the direction of arrows by way of the passage provided in the lower part of the body.

In the fluid storing chamber 11 is accommodated a material fluid such as powder to be subjected to granulation. While blowing up this material by means of the foregoing air current, a specific solvent is deposited on the material by spraying it through the nozzle 30 equipped in the atomizing chamber 12 disposed above said fluid storing chamber 11, and the resulting granulated or coated material is collected by the bag filters 18 stretched in the material catching chamber 13, while the exhaust is exclusively discharged through the exhaust port 19 by way of the passage 14. This exhaust port 19 is of course connected to the suction air current generating equipment.

As long as the material powder is blown up by air current and then caught by the bag filters 18 as stated above, the meshes of said bag filters 18 get clogged in an instant. Therefore, in order to overcome this trouble, vertical oscillation is imparted to the shaft 20 supporting the bag filters 18 thereby to beat the filters 18 and clear off dust attached to the interior thereof. This operation must be performed by applying the beating motion for several seconds at intervals of several minutes, and in order to suspend the air suction operation at the time of said beating motion, the damper 21 is provided for the exhaust port 19, said damper 21 being so devised as to be closed at the time of the beating motion. The aforesaid controlling means functions to control these motions so they are repeated automatically.

According to the fluid granulating/coating apparatus under the present invention, the upper part of the material catching chamber 13 is equipped with only the shaft 20 for the purpose of oscillating the filters 18, so that the interior of the material catching chamber 13 and the top plate 22 are smooth. Consequently, the inside of the material catching chamber 13 leaves no room for deposition of powder escaping from the filters 18 and is easy to clean, and accordingly, in the case of switching over to granulation processing of another material, the danger of admixing of the residue of a different material powder used in the preceeding operation can be minimized. Therefore, the present apparatus is very superior as a multipurpose apparatus from the view point of the control of quality of the granulation products, and is qualified for a machine conforming to the GMP regulations.

Besides, as the best part of its top plate member 22 can be composed of the safety lids 23 and 24 as blast screen, the safety of the apparatus can be further enhanced.

Figure 4:
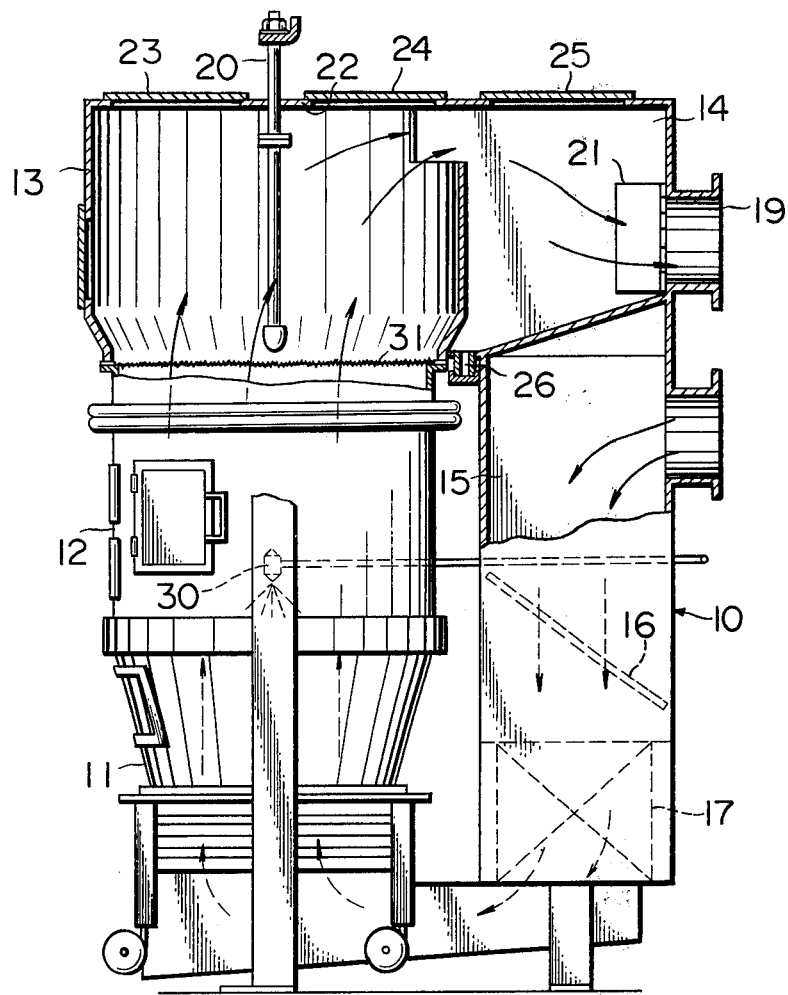
FIG. 4 is a partially cut side view of an embodiment illustrative of application of the present invention to the coating of granule.

Moreover, the present apparatus can be converted into an apparatus for applying a superb coating on grains by demounting the bag filters 18 in the material catching chamber 13, fixing a grain catching filter 31 above the spray nozzle 30 as shown in FIG. 4, and devising to impart oscillation to said filter 31 by utilizing vertical oscillation of the shaft 20 and to recover grains adsorbed to the filter 31 by shake-down operation for several seconds upon suspending the spray of coating liquid.

The reference numeral 25 denotes a safety lid of the exhaust passage 14, and at the bottom of said exhaust passage 14 is provided the exhaust port 26 for discharging the liquid for washing the exhaust passage 14 to be supplied through said safety lid 25.

What is claimed is:

1. In apparatus designed to perform granulation or coating by spraying a prescribed liquid to deposit on the material accommodated in a container disposed in the lower part of the apparatus while whirling up said material by means of suction air current, said fluid granulating or coating apparatus to be worked by utilizing suction air current and in which a receptacle in the shape of a cylinder with a smooth interior accommodates bag filters disposed in the upper part of the apparatus to catch the whirled-up material, an exhaust passage in the upper part of the apparatus including a portion offset laterally from said receptacle and an opening in a side surface of the apparatus through which said suction air current is to be discharged from said cylindrical receptable, means for generating said suction air and a damper for suspending air suction disposed away from a location directly above said cylindrical receptacle and communicating with said opening, a top plate over both said cylindrical receptacle and a portion of said exhaust passage, a plurality of relatively large-sized openings in said top plate, and safety lids over said openings being movable from over said openings in response to pressure within said apparatus.

2. A granulating/coating apparatus according to claim 1, wherein a filter capable of vertical oscillation in lieu of said bag filters is provided on the bottom of said cylindrical receptacle.

3. In apparatus designed to perform granulation or coating by spraying a liquid on a powder material entrained in a flow of air, a container having a lower portion for accommodating a powder material, a cylindrical receptacle with a smooth interior disposed in an upper portion of said container, filter means surrounded by said cylindrical receptacle, means within the container below the cylindrical receptacle for spraying a liquid onto powder material, means including a passage and an outlet opening from the passage offset laterally to the side of said cylindrical receptacle through which air is withdrawn from said container, openings in the container directly above the cylindrical receptacle, said openings comprising a large part of the top surface of the upper portion of the container, and safety lids covering said openings and movable from over said openings in response to pressure within the apparatus.

4. Apparatus as set forth in claim 3 including means remote from an area above said receptacle for withdrawing air from said container and for controlling the withdrawal of air.

5. In apparatus designed to perform granulation or coating by spraying a liquid on a powder material entrained in a flow of air, a container having a lower portion for accommodating a powder material, a cylindrical receptacle with a smooth interior disposed in an upper portion of said container, a plurality of bag filters surrounded by said cylindrical receptacle, means within the container below the cylindrical receptacle for spraying a liquid onto powder material, a passage both above and offset laterally to the side of said cylindrical receptacle through which air is withdrawn from said container, an opening in a side surface of the apparatus communicating with said passage, means remote from said receptacle for withdrawing air from said container and for controlling withdrawal of air, openings in the passage directly above the cylindrical receptacle and in the offset portion, said openings comprising a large part of the top surface of the upper portion of the container, and safety lids covering said openings and movable from over said openings in response to pressure within the apparatus.

* * * * *

UNITED STATES PATENT AND TRADEMARK OFFICE
CERTIFICATE OF CORRECTION

PATENT NO. : 4,027,624
DATED : June 7, 1977
INVENTOR(S) : Shimesu Motoyama

It is certified that error appears in the above-identified patent and that said Letters Patent are hereby corrected as shown below:

Column 1, line 55, "manufacturingeach" should be
    -- manufacturing each --

Column 2, line 37, "," should be -- ; --

Column 4, line 9 (Claim 1) after "suction air"
    insert -- current --

Signed and Sealed this

Twentieth Day of September 1977

[SEAL]

Attest:

RUTH C. MASON
Attesting Officer

LUTRELLE F. PARKER
Acting Commissioner of Patents and Trademarks